United States Patent [19]
Duncan et al.

[11] 3,722,297
[45] Mar. 27, 1973

[54] FLUID BEARING GYROSCOPE
[75] Inventors: Damon H. Duncan; Peter E. Jacobson, both of Phoenix, Ariz.
[73] Assignee: Sperry Rand Corporation
[22] Filed: Nov. 19, 1970
[21] Appl. No.: 90,926

[52] U.S. Cl............................................74/5.6, 74/5.7
[51] Int. Cl. ................................................G01c 19/18
[58] Field of Search............74/5, 5.5, 5.7, 5.6; 308/9

[56] References Cited
UNITED STATES PATENTS

| | | | |
|---|---|---|---|
| 3,606,793 | 9/1971 | Johnston | 74/5.7 |
| 3,362,231 | 1/1968 | Baldwin et al. | 74/5 |
| 2,821,859 | 2/1958 | Crockett | 74/5.6 |
| 3,107,540 | 10/1963 | Curriston | 74/5.7 X |
| 3,365,958 | 1/1968 | Bard et al. | 74/5 |
| 3,522,737 | 8/1970 | Brenot | 74/5.7 |

Primary Examiner—Manuel A. Antonakas
Attorney—S. C. Yeaton

[57] ABSTRACT

A frictionless, zero hysteresis two axis angular rate sensor of the gyroscopic type wherein a one piece, disk-shaped rotor, generally of the form of a "checker," is electrically spun at high speed and hydrodynamically suspended within a correspondingly shaped cavity in a fixed housing, the rotor constituting the total gas bearing surfaces, the armature of the electric rotor spin motor, the armature of electric pick-offs for detecting precession of the rotor, and the armature of an electric torquer for imposing a rate command for control and self-test purposes; the rotor/cavity wall surface interface being so configured as to maximize the radial support stiffness, the stability of the rotor along the spin axis and the sensitivity of the rotor to angular forces at right angles to the spin axis.

7 Claims, 2 Drawing Figures

INVENTORS
DAMON H. DUNCAN
PETER E. JACOBSON
BY

*H.P. Terry*
ATTORNEY

FLUID BEARING GYROSCOPE

BACKGROUND OF THE INVENTION

1. Field of the Invention

The present invention relates generally to gyroscopic apparatus and more specifically to gyroscopic angular rate sensors of the free rotor type for detecting and measuring angular rates of movements of a vehicle on which it is mounted about two orthogonal axes thereof.

The rate sensor of the present invention is of the type wherein a single rotating element is supported in a frictionless manner with complete freedom about all axes in a closed cavity by the hydrodynamic force of fluid, such as air or other gas, set in motion by virtue of the high speed spinning thereof. As will be explained more fully below, the rotor-gas-cavity wall interface is so configured as to provide radial, axial and angular spring forces arranged to radially support the sensitive element and simultaneously to maximize the stability thereof along its spin axis and yet also to maximize its sensitivity to rotational forces at right angles to the spin axis.

2. Description of the Prior Art

Conventional gimbal supported rate gyros suffer from mechanical complexity, rotor unbalance about a constrained spin axis, friction in the gimbal bearing, misalignments of mechanical and electrical components, acceleration effects on gimbal suspension, susceptibility to temperature variations and wear, etc., all of which adversely affects the gyro's threshold sensitivity, linearity of its output, zero null, hysteresis characteristic, and useful life.

Gas supported gyro rotors have been heretofore proposed but in many designs the gas bearing merely replaces the ball bearings of the rotor and/or the ball or jewel bearings of the gimbal, which while reducing some of the above effects does not affect others.

Also, so called free rotor or gimballess gyros have been proposed, one type embodying a gas or liquid supported sensitive element that rotates with the supporting housing and another type when the rotor is universal mechanical means supported on the end of a support shaft. All of these schemes suffer from many of the above problems and are exceedingly mechanically complex and hence very costly.

Free spring gas supported rotor rate sensors wherein the gas acts as a spring, similar in some respects to the gyro of the present invention, have been proposed, see for example U.S. Pat. No. 2,821,859, but this configuration is not practical since it requires external gas pressurization not only to spin the rotor but also to provide its suspension through gas leakage to the atmosphere. With this arrangement, the gyro speed and "spring" constants cannot be optimized or readily maintained. Furthermore, its washer or torroidal configuration severely limits its axial to angular stiffness ratio to the point that its sensitivity to angular rate renders it impractical for high accuracy rate systems. Its complex gas/surface interface increases greatly its manufacturing costs. Another disadvantage of this prior configuration is its inability to be externally torqued for command or self-test purposes.

SUMMARY OF THE INVENTION

The rate sensor of the present invention overcomes and substantially reduces the above disadvantages of known prior art structures. Its simplicity of mechanical and electrical design greatly increases its reliability and decreases its cost. Basically, the present rate gyro sensor is a two axis rate sensor and comprises a rotor having the general shape of a checker lapped smooth on all surfaces and contained within a correspondingly shaped closed cavity in a supporting housing normally fixed in the aircraft. The cavity is slightly larger than the rotor and the space therebetween is filled with a suitable gas, which can be air or other gas such as nitrogen, helium, etc. It will be understood, however, that the support fluid may be a liquid. The housing includes the stator of a hysteresis driving motor, the outer peripheral surface of the rotor constituting the saturable portion of the motor rotor; the arrangement being such that the rotor is driven at high speed about its axis of symmetry within the cavity, thereby generating the hydrodynamic force which floats the rotor and provides it with full angular and translational freedom of motion. The housing may, for example, be a right cylinder, the axis of symmetry of the rotor cavity and the rotor coinciding generally with the axis of symmetry of the housing. This axis will be referred to as the spin axis. Two orthogonal axes at right angles to the axis of symmetry constitute the input/output axis of the sensor and will be referred to as the x-axis and the y-axis each of which will be both an input and an output axis. Since the gas system is closed completely, the gas spring parameters may be precisely established at manufacture and thereafter maintained. These parameters are in effect spring constants attributable to the stable characteristics of gas and the cavity parameters.

With this configuration, the hydrodynamic gas pressure provides six primary restraints, three translational and three angular all referenced to the above three primary axes and, in accordance with the teachings of the present invention, the mechanical design of the rotor/gas/cavity walls interface determines and controls these restraints. The outer peripheral surface of the checker shaped rotor and its corresponding cavity wall provide a very high restraint to translational movements of the spinning rotor along the x and y axis. The third translational restraint, i.e., along the spin axis, is also very high and completely stable. This restraint is critical and is provided by shaping the opposed flat circular surfaces of the cavity side walls to provide a desired pressure profile across the diameter of the rotor, i.e., high pressure at this axis and dropping off rather rapidly toward the rotor periphery. This shaping may take the form of shallow spiral grooves or spiral roughened surfaces extending generally radially from a small diameter unshaped area at the spin axis. The shaping of the spirals is very carefully controlled as it is essential in providing the first and second of the above angular restraints; viz: angular movements about the x and y axes. These angular restraints are critical to the characteristics of the gyro and are very low compared to the axial translational restraint and it is an object of the present invention to maximize and maintain the axial/angular ratio between these restraints. The third angular restraint, i.e., about the spin axis, can be made low by reason of the design configuration as it acts to retard rotation of the rotor about the spin axis. The gas spring reference is frictionless and contributes to the hysteresisless characteristics of the gyro in responding to angular rates experienced about the input axes.

The single piece rotor also constitutes the armature of the electric pick-offs which supply outputs proportional to the sensed rates about the x and y axis. These pick-off or signal transducers are of the multiple plate, high frequency capacity type and comprise first and second pairs of condenser plates, each pair being equally radially spaced along the x and y axis respectively of one cavity wall on each side of the spin axis and suitable electronic circuitry to convert the differential capacity change due to angular displacement of the rotor spin axis relative to the cavity walls into signals useful for control purposes.

The single piece rotor further constitutes the armature of the electric torque motors by which the rate sensor may be caused to precess to an angular position representative of a commanded rate, a requirement for stable platform applications, for example. Additionally, the torque motors may be employed to exercise the gyro for self-test purposes, a requirement for present day rate sensors used for control purposes, such as in automatic stabilization equipment for aircraft. The torque motors are simply coils mounted in the same orientation as the pick-off plates but on the opposite wall of the rotor cavity. As will be explained below, the application of a torque signal to the y-axis torquer, for example, will result in a displacement of the rotor in that axis which displacement represents or simulates a rate input about the x-axis.

Thus, the rate sensor of the present invention is unique in that the single dynamic element, i.e., the rotor, comprises a single machined and lapped disk having the general shape of a checker, and acts as motor armature, torquer armature and pick-off armature and has gas bearing surfaces for hydro-dynamically and hence frictionlessly suspending the rotor in a correspondingly shaped housing cavity, wherein the axial-to-angular restraint ratio is maximized and cross coupling effects are minimized whereby to provide a zero hysteresis, high accuracy, high response, long life two-axis rate sensor.

DESCRIPTION OF THE PREFERRED EMBODIMENT

Figure 1:
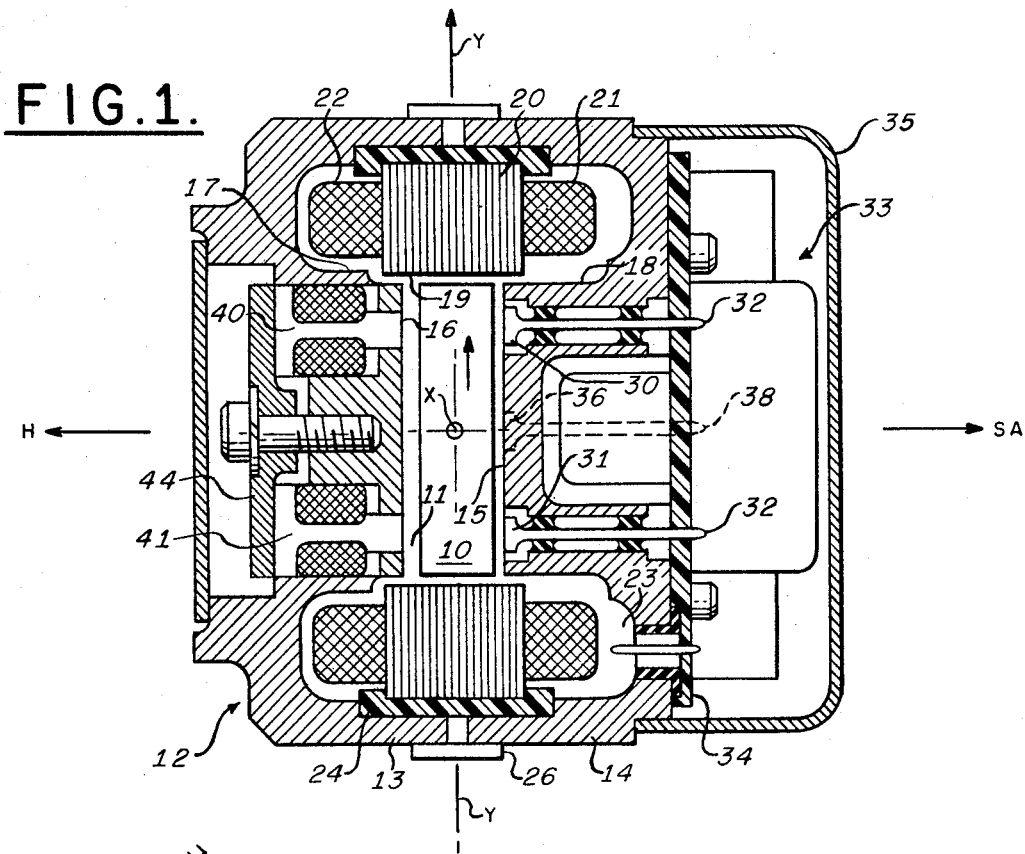
FIG. 1 is a cross-sectional view of the gyro constructed in accordance with the teachings of the present invention.

Referring now to FIG. 1, the gyroscopic device of the present invention comprises an inertial element or rotor 10 which consists of a single or unitary disk, preferably of hysteresis rotor steel, formed generally in the shape of a conventional checker game piece and lapped smooth on its continuous flat end surfaces and its continuous cylindrical surface. The rotor is contained in a correspondingly shaped cavity 11 within a cylinder-shaped housing 12 consisting generally of two end portions 13 and 14. The internal cavity end walls are defined by the end surfaces 15 and 16 of reentrant portions 17 and 18 of end portions 13 and 14, respectively, while the circular cavity side wall is defined by the inner circular surface 19 of the laminated core portion 20 of the stator 21 of a hysteresis driving motor the rotor constituting the rotor of the motor. The inner surfaces of the cavity 11 are also lapped smooth, especially the cylindrical side wall surface 19. The stator windings 22 are accommodated in the cylindrical opening 23 formed by the outer walls of end pieces 13 and 14 and reentrant portions 17 and 18 thereof. A spacer element 24, precisely machined and cooperable with the machine lip of end portion 14 serves as a motor stator alignment ring whereby the electric field of the stator may be very accurately aligned with respect to the cavity 11 and contribute no rotor drive component normal to the rotor spin axis. Additionally, an alignment ring 26 is provided so as to enable a precision alignment and spacing of the opposed interior circular end walls of the interior cavity 11.

The the X—between the interior walls of cavity 11 and the external walls of rotor 10 is filled with a suitable fluid such as a gas, which may be air, nitrogen, helium or the like, at a suitable pressure. Thus, with the rotor 10 being spun at high speeds by motor 21, the gas by virtue of hydrodynamic forces suspends the rotor 10 within the cavity 11 with full six degrees of freedom, three angular and three translational. In other words, the gas performs the function of the rotor mount gimbal of a conventional gyroscope without the mechanical and operational disadvantages set forth above. At the same time, the compressibility characteristic of the gas, as will be explained more fully below, provides the spring restraint and damping required of a gyroscopic rate sensor.

As shown in FIG. 1, the three major reference axes for the gyro are fixed in the housing and are as follows: the spin axis SA, which in the configuration illustrated constitutes the axis of symmetry of cylindrical housing and cavity; axis X—X orthogonal to the spin axis and in FIG. 1 normal to the plane of the drawing; and axis Y—Y also orthogonal to both the spin axis SA and axis X—X; the axes X—X and Y—Y constitutes both input and output axes of the sensor as will be explained below.

In normal use, output data proportional to turn rate components about the input axes of the gyro is derived by means of high frequency capacity pick-up elements and associated electronics. For sensing tilts of the rotor 10 within cavity 11 about axis X—X, a pair of capacity plates 30 and 31 are mounted in the face 15 of reentrant portion 18 of end wall 14. These plates are precisely equally spaced from the spin axis SA in the direction of axis Y—Y. Electrical connection 32 is made with plates 30 and 31 and brought out to an electronics package 33 consisting of a circuit board 34 secured to end portion 14 and protected from the external environment by a suitable cover or end cap 35. In a similar manner corresponding capacity plates 36 and 37 (only one of which is shown in the section of FIG. 1) are provided for detecting tilts of rotor 10 about axis Y—Y, the output connections 38 and 39 (only 38 being shown in the section of FIG. 1) being similarly brought out to the electronics package 33. The other elements of the capacitive pick-offs 30 and 31 comprise the rotor 10 and the housing end walls 15 and 16, the gas constituting the capacitor dielectric medium. It should be understood that other forms of pick-offs may be used without departing from the teachings of the present invention in its broader aspects.

In many applications of the rate sensor of the present invention, it may be desired to provide an input rate command function, particularly in connection with performing preflight or inflight tests of the gyro. This is sometimes referred to as a self-test capability. For this purpose, electromagnetic torquer coils are provided and, in the illustrated embodiment, comprise core and winding assemblies 40 and 41 mounted in reentrant portion 17 of end portion 13 equally spaced from the spin axis SA in a direction parallel to axis Y-Y whereby and properly energized will produce a torque about this same axis to simulate a housing rate about axis Y—Y. In a similar fashion corresponding torquer coils 42 and 43 (not shown in the cross-section of FIG. 1) for applying command input torques about axis Y—Y for simulating housing rates about axis X—X. Torquer elements 40-43 are maintained in place by clamp plate 44. Operation of the sensor in response to an input command through the torquers will be described below.

In accordance with the principle teachings of the present invention, the hydrodynamic forces generated by the spinning rotor 10 provide all of the gyro support and damping forces and spring restraints required of a rate sensor; that is, to provide the translation and angular restraints above-mentioned. It is an objective of the present invention to optimize these forces in order to provide optimum sensitivity, damping, and ruggedness.

The checker configuration of the rotor substantially reduces any gas pressure restraint of the rotor to angular motion about the spin axis and provides a substantially frictionless rotary support about a diameter while the hydrodynamic restraints to translational motion of the rotor in the plane defined by the X—X and Y—Y axes are very high whereby to provide support against acceleration and shock loads. The restraints with respect to the remaining axes of freedom are optimized by the following structure.

It is desired that the translational restraint of the rotor along the spin axis be made very high and very stable so as to in effect provide a stable pivot point near to the intersection of the X—X and Y—Y axes about which the rotor may freely rotate, the latter restraint being relatively low by comparison. The ratio of the latter two restraints, which may be referred to as the axial to angular spring-rate ratio or stiffness ratio, should be as high as possible. The rotor/gas/cavity configuration of the present invention provides for the optimization of this ratio as well as the control of the angular stiffness provided by the gas.

Figure 2:
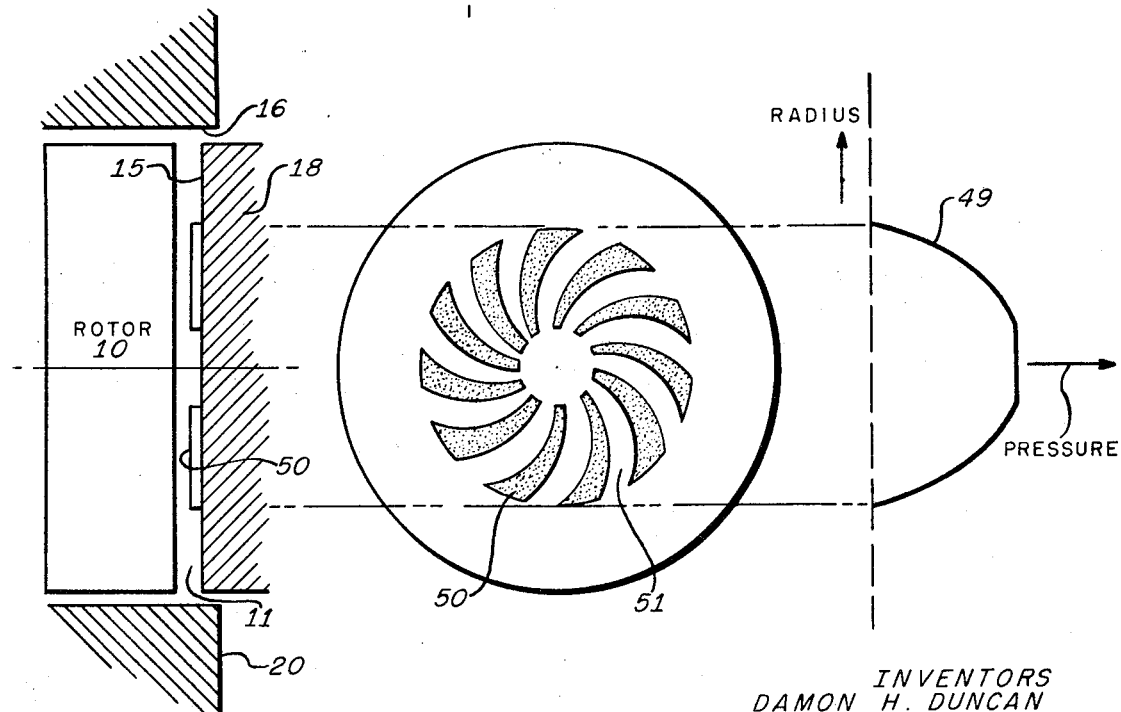
FIG. 2 is a diagram illustrating the rotor/cavity/gas pressure interface of the device of FIG. 1.

Referring now to FIGS. 1 and 2, the desired axial to angular spring restraint is provided by shaping the end walls 15 and 16 so as to provide a gas pressure profile across the diameter of the rotor face/end wall gaps which is very high at the center, i.e., at the spin axis SA, and drops off toward the rotor periphery, as illustrated by the pressure curve 49 at the right of FIG. 2. The end wall shaping comprises lands and grooves or areas 50 and 51 of different axial profiles. These areas have a generally spiral configuration emanating from a small diameter unshaped area near the spin axis and extending outwardly toward and preferably terminating short of the periphery of the end walls. The actual dimensions and slope of the spiral shaping depends, among other things, upon the normal operating angular velocity of the rotor, the viscosity of the gas and desired axial to angular stiffness ratio. It will be understood that the actual groove profile may vary for each application and is selected, as stated, to achieve maximum stability of the rotor along the spin axis and the desired high axial to angular stiffness ratio. Furthermore, since the entire gas envelope is closed and sealed, once the parameters are established they are thereafter maintained substantially constant. Additionally, since the gyroscopic rotor of the present invention operates in a substantially frictionless environment and all forces acting thereon are substantially "pure" forces without friction, the rate sensor is devoid of hysteresis effects.

Having now described the structure of the rate sensor of the present invention, the operation thereof will now be discussed under two normal operating conditions, i.e., upon the sensor housing being subject to a rate of turn in inertial space about, for example, the Y—Y axis and upon a commanded rate input to, for example, the torque coils 40 and 41.

Assume that the sensor is mounted in an aircraft and that it is subjected to a rate of turn component in inertial space about the Y—Y axis in say, a clockwise direction looking toward the top of the drawing of FIG. 1. Upon initiation of the turn rate, i.e., a turn acceleration, a moment due to compression of the gas between the rotor face and cavity end walls, will be produced tending to rotate the rotor 10 clockwise about the Y—Y axis. This rotation will result in a signal proportioned to turn acceleration being generated by pick-offs 38 and 39. With the rotor spinning in the direction of the vector arrow, this moment will produce a clockwise precession of the rotor 10 about the X—X axis in the plane of the page. As the turn rate becomes constant, the precession of the rotor 10 about the X—X axis causes a CCW gas reaction moment to appear in the X—X axis. This reaction moment causes a CW precession of the rotor 10 in inertial space about the X—X axis which when equal to the case rotation rate reduces the input moment in the X—X axis and the precession in the Y—Y axis to zero. Under a steady-state turn rate, the gyro rotor 10 assumes a steady-state canted position within the cavity 11 about the X—X axis, the angular position of which is proportional in magnitude to this rate of turn about the Y—Y axis. This angular displacement will be sensed by differential change in capacitance of the pick-off plates 30 and 31 and the electronics will supply an output proportional in amplitude to the magnitude of the turn rate and of a phase dependent upon the direction of the turn rate about the Y—Y axis. The same operation occurs for turn rate components about the X—X axis.

In modern rate sensor applications it is desired to exercise the sensor for self-test purposes. Thus, an electrical signal applied to torquer coils 40 and 41, for example, in a direction such as to produce a clockwise torque about the X—X axis as viewed in FIG. 1, will effectively produce a counterclockwise gas compression moment on the rotor 10 in the X—X axis which is equal to the magnitude and cancels the applied moment and results in an angular displacement of the rotor in the X—X axis which is equivalent to a housing rate input about axis Y—Y. If the gyro is operating normally, a corresponding output rate signal from pick-off plates 30 and 31 will be provided indicating such normal operation.

It should be noted that as stated above, since the initial response of the gyro to a turning moment acting on the aircraft is a turn acceleration and it is reflected in a relation angular movement of the rotor 10 and housing 12 about the gyro input axis proportional thereto, this initial movement will result in a signal being generated in the pick-off in the input axis proportional to this turn moment or angular acceleration. In other words, this signal is proportional to the angular acceleration producing the turn rate. This angular acceleration signal may also be used for control purposes. For example, in an aircraft stability augmentation system for the yaw and pitch axes of the aircraft this turn acceleration signal could be used instead of the turn rate signal since in these axes it is normally desired to block out the steady state turn rate term. Of course, the normal turn rate signal from the gyro output axis pick-off could also be used where necessary or a combination of turn acceleration and turn rate signals suitably filtered, for example, in the yaw axis to damp the clutch roll characteristics of the aircraft, may be used.

While the invention has been described in its preferred embodiment, it is to be understood that the words which have been used are words of description rather than limitation and that any changes made within the purview of the appended claims may be made without departing from the true scope and spirit of the invention in its broader aspects.

We claim:

1. A gyroscopic rate sensor comprising
   a solid disc-shaped rotor having flat circular end wall surfaces and an interconnecting cylindrical outer peripheral surface,
   a housing having a sealed internal cavity, the effective internal wall surfaces thereof conforming to the external wall surfaces of said rotor but of slightly larger over-all dimensions and receiving said rotor freely therein,
   a fluid contained within and completely filling the internal cavity space defined by said rotor and housing walls,
   motor means for spinning said rotor about its axis of symmetry to thereby generate hydrodynamic pressure forces between the cavity and rotor walls whereby said rotor is supported within said cavity with limited freedom of translational and precessional motion, and
   means in the interface between the corresponding circular flat end wall surfaces of said rotor and cavity for increasing the hydrodynamic pressure at said axis of symmetry relative to that at the peripheral zone of said interface whereby to provide a relatively high ratio of axial to angular hydrodynamic stiffness of said rotor to external axial and angular forces acting on said housing.

2. The rate sensor as set forth in claim 1 wherein said last-mentioned means includes profiled, spiral shaped configurations on one of said circular wall surfaces and extending in generally radial directions from said axis of symmetry.

3. The rate sensor as set forth in claim 2 wherein said spiral configurations are on the opposed internal circular surfaces of said housing.

4. The apparatus as set forth in claim 2 wherein said spiral configurations extend from a finite central radius of said circular housing interior wall faces to a radius spaced a finite distance from the periphery thereof.

5. The rate sensor as set forth in claim 1 wherein said motor stator includes a stator core element having a cylindrical central opening and where the internal walls thereof constitutes the cylindrical interior wall of said cavity.

6. The rate sensor as set forth in claim 1 further including pick-off means wherein
   first and second pairs of pick-off elements are arranged on said circular housing wall along mutually perpendicular diameters for detecting angular movements of said rotor within said cavity about mutually perpendicular axes orthogonal to said axis of symmetry and parallel to said wall diameters in response to turning forces acting on said housing, and
   the output of said first pair of pick-off elements being proportional to the turn acceleration of said housing in response to a turning force and the output of said second pair of pick-offs being proportional to the turn rate of said housing in response to the same turning force.

7. The rate sensor as set forth in claim 1 further including electrical multiple part pick-off means and electrical multi-pole part torquer means wherein said disk shaped rotor constitutes one part of said pick-off means and said torquer means and the other part of said pick-off means is supported in one of said circular interior housing walls while the other part of said torquer means is supported in the other one of said circular interior housing walls.

* * * * *